United States Patent [19]
Garbarino

[11] Patent Number: 4,976,325
[45] Date of Patent: Dec. 11, 1990

[54] FLUTED CUTTING TOOL AND METHOD OF PRODUCING SAME

[75] Inventor: Carl Garbarino, Sterling Heights, Mich.

[73] Assignee: Carolina Twist Drill, Inc., Warren, Mich.

[21] Appl. No.: 360,318

[22] Filed: Jun. 2, 1989

[51] Int. Cl.$^5$ .............................................. E21B 10/44
[52] U.S. Cl. .................................... 175/394; 175/410
[58] Field of Search .............. 175/394, 395, 410, 414, 175/415, 323; 76/108 R, 108 A, 108 T; 408/144, 145, 704, 705

[56] References Cited

U.S. PATENT DOCUMENTS

| | | | |
|---|---|---|---|
| Re. 19,182 | 5/1934 | Emmons | 408/144 |
| 1,323,988 | 12/1919 | Kellogg . | |
| 1,847,302 | 3/1932 | Emmons | 76/108 T |
| 1,977,845 | 10/1934 | Emmons . | |
| 3,017,790 | 1/1962 | Werle . | |
| 4,314,616 | 2/1982 | Rauckhorst et al. | 175/394 |
| 4,356,873 | 11/1982 | Dziak | 175/410 |
| 4,503,920 | 3/1985 | Clement | 175/394 |
| 4,642,003 | 2/1987 | Yoshimura | 76/108 T |
| 4,679,971 | 7/1987 | Maier | 408/145 |
| 4,696,355 | 9/1987 | Haussmann | 175/395 |

*Primary Examiner*—Bruce M. Kisliuk
*Assistant Examiner*—Terry Lee Melius
*Attorney, Agent, or Firm*—Basile and Hanlon

[57] ABSTRACT

A carbide-tipped drill bit and method for manufacture is presented which produces drill bits of consistent geometries in which the flutes are machine ground in one step, which eliminates the hand blending operation of the carbide insert as used in the prior art. As a result, carbide-tipped drill bits are manufactured having a single helix angle which is consistent from drill bit to drill bit.

10 Claims, 2 Drawing Sheets

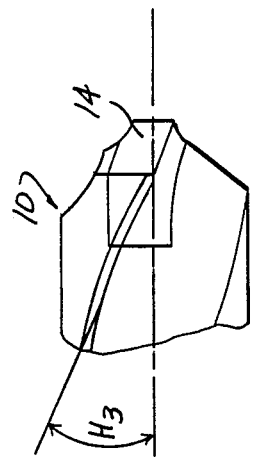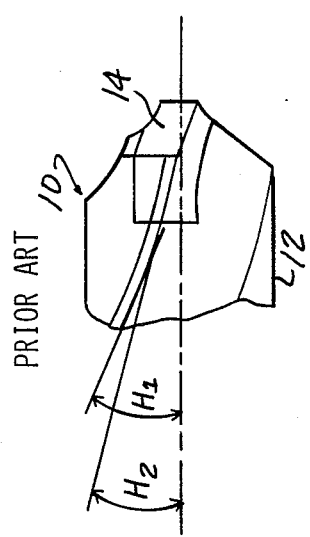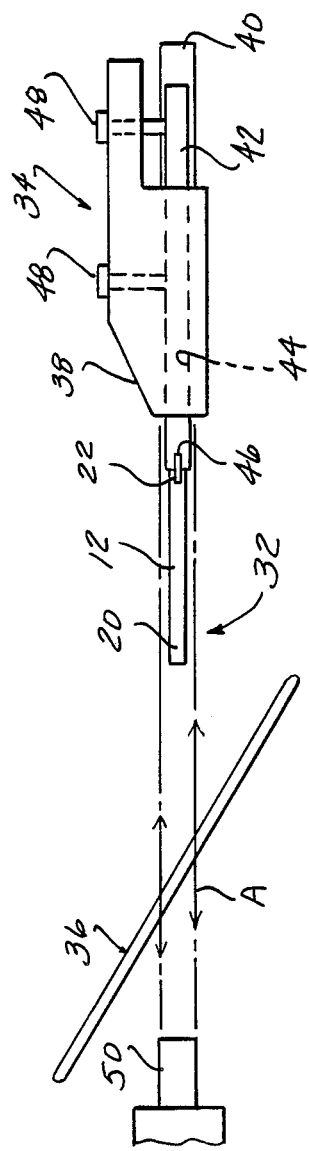

FLUTED CUTTING TOOL AND METHOD OF PRODUCING SAME

BACKGROUND OF THE INVENTION

1. Field of the Invention

The present invention is directed to a carbide-tipped drill bit and a method for manufacturing the bit which produces consistent, single helix geometries.

2. Description of the Relevant Art

Carbide-tipped drill bits are generally produced by cutting, heat treating, and centerless grinding steel rod stock which is to be used as a drill bit. Subsequently, flutes having a desired helix angle are ground in the exterior surface of the rod which is subsequently finish ground and cleared to produce the blank from which the carbide-tipped drill bit will be manufactured.

Following production of the blank, the manufacturer slots the tip end of the fluted blank at a predetermined angular position and depth to accommodate proper insertion of a carbide tip blank. The blank is brazed into the slot and the face and margin are then hand blended into the original flute geometry and finishing operations are performed.

The second grinding operation, which blends the carbide tips into the pre-existing flutes is generally carried out by hand using a diamond cutting wheel. The result of the hand operation is a second helix angle, or "roll-back," where the flute helix approaches the tip. This second helix angle varies from drill bit to drill bit and prevents the manufacturer from achieving batch consistency. Additionally, the second grinding operation must be done manually, thereby increasing production time and cost. Due to the blending operation, most manufacturers of carbide-tipped drill bits are limited to one, or a few standard drill geometries due to the need to set up machining which is specific for the hand blending operation and the flute geometry. This limits flexibility regarding the provision of unusual or special application flute geometries.

The present invention is directed to a method of producing a carbide-tipped drill bit which addresses the problems described above.

SUMMARY OF THE INVENTION

The method of the present invention produces a carbide-tipped drill bit having only one, constant helix angle which is consistently reproducible thereby assuring consistency in drill geometry from drill bit to drill bit. The method for producing the drill bits of the present invention comprises the steps of cutting and heat treating steel rod stock as in the prior art. However, prior to centerless grinding, the heat treated steel rods are slotted at one end to accommodate the insertion of a carbide-tipped blank. Of course, it should be understood that the rods could be slotted prior to heat treating. The blank is inserted into the slot where it is brazed in place. For reasons described below, the tip blank is separated from the sides of the steel rod slot by copper shims, and silver solder is used to braze the tip blank and shims into the slot.

Following brazing, the rod with the tip blank and shims inserted therein is centerless ground to a desired drill bit diameter. The rod is then fluted using a standard, vitrified grinding wheel instead of the more expensive diamond wheels which are generally used to blend the carbide tips following insertion. The vitrified wheels adequately grind the flutes in the carbide tip area with a minimum of increased wheel wear. However, due to the substantial increase in heat generated by grinding the flutes through the pre-installed carbide tips, the copper shims, described above, are required to be placed between the tip faces and the rod slot faces. The copper shims compensate for the difference in coefficients of thermal expansion of the carbide tip material and steel rod material thereby acting to prevent cracking of the carbide tip during the fluting operation.

The use of the vitrified wheels represents a substantial savings when compared to the cost of diamond wheels, even with the slight increase in replacement rate. Moreover, the ability to flute the carbide-tipped rod in a single operation, eliminates the second, hand blending operation, allowing production of uniform bit geometries with a single helix angle. Standard finishing operations are subsequently performed.

Slotting the steel rod and inserting the carbide tip blank prior to the fluting operation adds the requirement of precise radial alignment of the carbide-tipped rod with the flute grinding wheel at the beginning of the flute grinding process to ensure that the carbide tip is properly positioned relative to the drill lip following the fluting operation. To ensure proper alignment, a special fixture is provided to radially position the bit relative to the flute grinding wheel. The fixture operates in the feeder portion of the grinding machine to hold the end tip portion of the carbide insert, which protrudes beyond the end of the steel rod, thereby radially positioning the carbide-tipped rod with relation to the grinding wheel. During finishing operations, the protruding portion of the carbide tip is removed. The provision of consistent, single helix drill geometries produced by a single, machine grind process which eliminates the hand blending operation and the second helix angle produced thereby, allows the manufacturer flexibility to produce a variety of flute forms and angles. Virtually any flute form which can be produced in a standard, non-carbide-tipped drill bit can be produced, using the present method, in a carbide-tipped drill bit with consistent batch results.

Other objects and features of the invention will become apparent by reference to the following specification and to the drawings in which:

BRIEF DESCRIPTION OF THE DRAWINGS

FIG. 1 is a side view of the tip portion of a typical carbide-tipped drill bit;

FIG. 2 is a side view of the tip portion of a carbide-tipped drill bit of the present invention;

FIG. 6 is a schematic plan view showing the alignment apparatus used to produce the carbide-tipped drill bit of the present invention.

DESCRIPTION OF THE PREFERRED EMBODIMENT

FIGS. 1 and 2 shows a comparison between the tip helix configuration of a carbide-tipped drill bit formed using standard production methods (FIG. 1), and one produced using the method of the present invention (FIG. 2). In the prior are drill bit of FIG. 1, two helix angles H1 and H2 are indicated. H1 is the standard helix angle of the drill bit which is produced during fluting of the steel rod. This helix angle is consistent across the entire length of the drill bit, except for the small portion at the tip of the bit, in which the helix angle changes to H2. The change in helix angle is a result of a second machining operation required to "blend in" carbide tip 14, following its insertion into the end portion of steel rod 12. This blending operation is required because the carbide tip is inserted following fluting of the steel rod 12.

FIG. 2 shows a carbide-tipped drill bit 10 which is produced by the method of the present invention. In this case, a single consistent helix angle H3 is produced. The second helix angle H2 produced during the blending operation is eliminated as is variation which occurs in angle H2 from drill bit to drill bit.

Figure 4A:
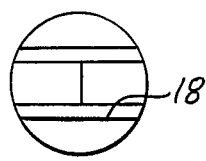
FIGS. 3, 3A, 4, 4A, 5 and 5A are side and end views, respectively, showing various steps in the production of the carbide-tipped drill bit of the present invention.
Figure 5A:
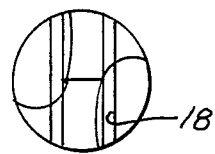
Figure 4:
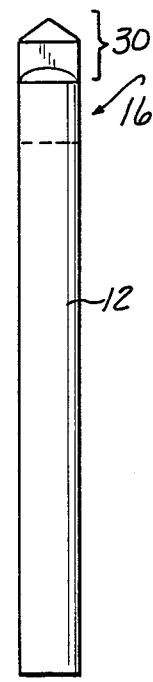
Figure 5:
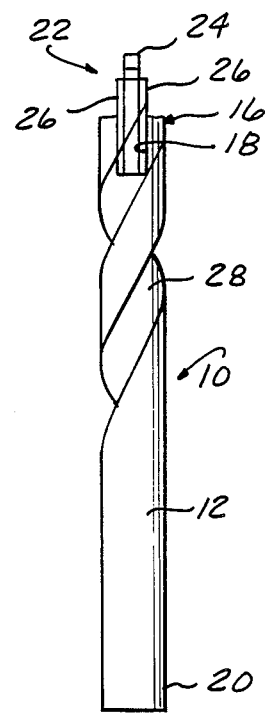

FIGS. 5 and 5A show a drill bit, designated generally as 10, produced by the method of the present invention. The bit comprises a cylindrical drill body 12 having a first drilling end 16 in which an open ended transverse slot 18 is formed to extend diametrically across and axially into end 16. A second coupling end 20 is formed with attachment means, for releasably attaching drill bit 10 to a source of rotation. The attaching means will vary according to application and such means are well known in the art. A carbide tip assembly, referred to generally as 22, is fixedly inserted into slot 18 formed in first drilling end 16. The carbide tip assembly 22 comprises a plate-like carbide cutting element 24 having longitudinally extending sides, and first and second copper shims 26, placed in face-to-face engagement with each of the longitudinally extending sides of carbide tip 24 in a sandwich-like configuration. Both the copper shims 26 and carbide tip 24 are of a length which allows the carbide tip assembly 22 to extend outwardly from the end of drill body 12 when the assembly 22 has been fully inserted in slot 18, as described below. The carbide tip assembly 22 comprising the carbide tip 24 and copper shims 26, are slidably inserted into slot 18 and fixed therein by brazing or the like. Typically, a silver solder is used to fix the carbide tip assembly 22 into slot 18. The silver solder can be provided in a sandwich-form with the copper shim 26 disposed between two spaced layers of silver solder. Drill flutes 28 are formed in drill body 12 extending spirally from first drilling end 16 through carbide tip assembly 22, to a predetermined axial location which depends on a desired application and manufacturer's design requirements. The drill flutes 28 have a helix angle H3 (see FIG. 2) which is consistent throughout the entire length of each drill flute. The extended portion 30, shown in FIG. 4, of carbide tip assembly 22 is used during the fluting operation, to hold the drill body 12 in a predetermined radial position relative to the cutting wheel. Following fluting, extended portion 30 is removed during standard finishing operations which include the placement of the tip on the drill bit 10.

Figure 3:
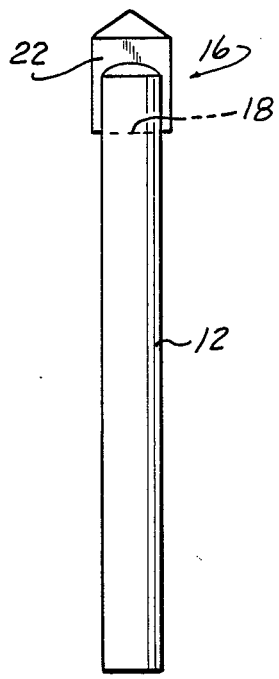
Figure 3A:
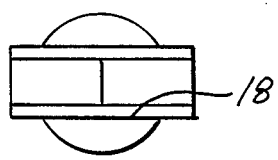

A method of producing the drill bit 10, described above, will now be presented. FIGS. 3, 4 and 5 show the drill bit 10 following various steps of the manufacturing process. Initially, steel rod stock 12 is cut and heat treated to a predetermined length and hardness. Following heat treating, a slot 18 is formed at one end thereof. The slot is an open ended transverse slot extending diametrically across and axially inwardly relative to the drill body 12. Subsequently, the carbide tip assembly 22, described above, is inserted into slot 18 of drill body 12. The tip assembly 22 is brazed into position in slot 18 using a silver solder (see FIGS. 3 and 3A). Subsequently, the drill body 12 of FIG. 3 is centerless ground to a predetermined drill bit diameter (see FIG. 4). In addition to bringing the drill body 12 to a desired drill bit diameter, excess portions of the carbide tip assembly 22 and brazing material are also removed.

Following the grinding operation, the drill body 12, having extended portion 30 (see FIGS. 4 and 4A) extending outwardly from first drilling end 16, is placed in a flute grinding apparatus, designated generally as 32 in FIG. 6. The grinding machine has an alignment apparatus 34 for precise radial alignment of drill body 12 relative to grinding wheel 36. The apparatus consists of a main body 38 slidingly mounted upon framework 40, and having an alignment shaft 42 mounted in a bore 44 which passes axially through body 38. Alignment shaft 42 has a slot 46 formed in one end thereof configured to slidingly engage extended portion 30 of carbide assembly 22. Alignment shaft 42 may be rotated until drill body 12 is in a desired configuration for flute grinding with relation to grinding wheel 36 at which time it is fixed in position using locking screws 48. Once radial alignment has been achieved, alignment apparatus 34 and associated drill body 12 are moved axially into flute grinding machine 32 to a position wherein second coupling end 20 of drill body 12 engages chuck 50. This operation is indicated by arrow A in FIG. 6. Following engagement of drill body 12 with chuck 50, alignment apparatus 34 is returned to its original position clear of grinding wheel 36 so that chuck 50 may feed drill body 12 through the flute grinding process wherein flutes 28 are ground on the external surface of the carbide tip assembly 22 and drill body 12. The result of this operation is shown in FIGS. 5 and 5A.

Following the fluting operation, standard finishing steps are performed on the tip of the drill bit 16 to remove the extended portion 30 and to form a standard tip on drill body 12.

While certain embodiments of the invention have been described in detail above in relation to a method of producing a carbide-tipped drill bit, it will be apparent to those skilled in the art that the disclosed embodiment may be modified. Therefore, the foregoing description it to be considered exemplary rather than limiting, and the true scope of the invention is that defined in the following claims.

What is claimed is:

1. A method of producing a carbide-tipped drill bit comprising the steps of:
    cutting and heat treating steel rod stock to a predetermined length and hardness;
    forming an axially inwardly extending, open ended transverse slot extending diametrically across a first end of said rod;
    inserting a carbide tip assembly, comprising a plate-like carbide tip element having longitudinally extending sides and shims placed in face-to-face engagement with said sides of said tip element in a sandwich-like configuration, into said slot in said rod, such that a portion of said carbide tip element extends longitudinally beyond said first end of said rod when fully engaged within said slot;
    brazing said carbide tip assembly into position in said slot;
    grinding said rod to a predetermined drill bit diameter after brazing said carbide tip element in position;
    aligning said rod relative to a grinding apparatus with said portion of said carbide tip element aligned in a predetermined radial position relative to a vitrified grinding wheel of said grinding apparatus; and grinding flutes, of a predetermined configuration, through the external surface of said carbide tip assembly and said rod in a single machine operation with said vitrified grinding wheel of said grinding apparatus.

2. A method of producing a carbide-tipped drill bit, as defined in claim 1, wherein said shims are formed of copper (Cu) material.

3. A method of producing a carbide-tipped drill bit, as defined in claim 1, wherein said brazing solder comprises a silver (Ag) material.

4. A method of producing a carbide-tipped drill bit, as defined in claim 1, wherein said flutes are formed with a single helix angle.

5. A single helix carbide-tipped drill bit produced by the method of claim 1 comprising:
- a cylindrical drill body having a first drilling end formed with an axially inwardly extending open ended, transverse slot extending diametrically across said end, and a second coupling end for attachment to a source of rotation;
- a carbide tip assembly, having a plate-like carbide cutting element with longitudinally extending sides and shims, placed in face-to-face engagement with each of said sides in a sandwich-like configuration, fixedly inserted into said slot;
- flutes extending spirally from said first drilling end, through said carbide tip assembly and said drill body to a predetermined axial location, said flutes having a single helix angle along their entire lengths.

6. A method of producing a fluted cutting tool with hardened cutting and chisel edges comprising the steps of:
- forming an axially inwardly extending, open ended transverse slot extending diametrically across a first end of a longitudinally extending rod;
- inserting a tip assembly into said open slot in said first end of said longitudinally extending rod, said tip assembly including a plate-like hardened material element having a greater hardness than said rod, said plate-like element having longitudinally extending sides and shim members placed in face-to-face engagement with said sides of said plate-like member such that said shim members are interposed between said rod and said plate-like element to compensate for different rates of thermal expansion in said rod and said plate-like element, wherein a portion of said plate-like element extends longitudinally beyond said first end of said rod when fully engaged within said slot;
- brazing said tip assembly in position in said slot of said rod;
- aligning said rod relative to a grinding apparatus with said portion of said plate-like element aligned in a predetermined radial position relative to a vitrified grinding wheel of said grinding apparatus; and
- grinding flutes with a single helix angle in an external surface of said rod and said tip assembly in a single machine operation with said vitrified grinding wheel of said grinding apparatus after brazing said tip assembly in said slot of said rod.

7. The method of claim 6 wherein said shim members are formed of copper (Cu) material with silver (Ag) solder material disposed on an external surface of the shim members such that the silver solder material is interposed between the copper material of the shim member and the rod, as well as interposed between the copper material of the shim member and the plate-like element forming a silver-copper-silver sandwich-like shim member.

8. The method of claim 6, wherein said flutes are formed with a single helix angle through said tip assembly and said rod.

9. A cutting tool produced by the method of claim 6 comprising:
- a cylindrical body having a first end formed with an open slot in said first end, and a second coupling end for attachment to a source of rotation;
- a tip assembly, having a plate-like hardened material element with hardened cutting and chisel edges, said plate-like element having longitudinally extending sides, said tip assembly including shims placed in face-to-face engagement with each of said sides of said plate-like element in a sandwich-like configuration, said tip assembly fixedly secured in said slot; and
- said cylindrical body having flutes extending spirally from said first end through said tip assembly and said body to a predetermined axial location, said flutes having a single helix angle through said tip assembly and said cylindrical body.

10. A fluted cutting tool having hardened cutting and chisel edges comprising:
- a cylindrical steel body having a first end formed with an axially inwardly extending open ended slot extending diametrically across said first end and a second coupling end for attachment to a source of rotation;
- a tip assembly having a plate-like hardened carbide material element with longitudinally extending sides, said tip assembly including copper shims placed in face-to-face engagement with each of said sides of said plate-like element in a sandwich-like configuration, said tip assembly fixedly secured in said slot with silver brazing solder; and
- said cylindrical body having flutes extending spirally from said first end, through said tip assembly and said cylindrical body to a predetermined axial location, said flutes having a single helix angle along an entire longitudinal length from said first end to said predetermined axial location formed during a single machine operation with a vitrified grinding wheel.

* * * * *